Feb. 18, 1964     H. J. MODREY     3,121,453
QUICK-ACTING FASTENER DEVICE FOR SECURING
TOGETHER SEVERAL MEMBERS
Filed Nov. 8, 1960     2 Sheets-Sheet 1
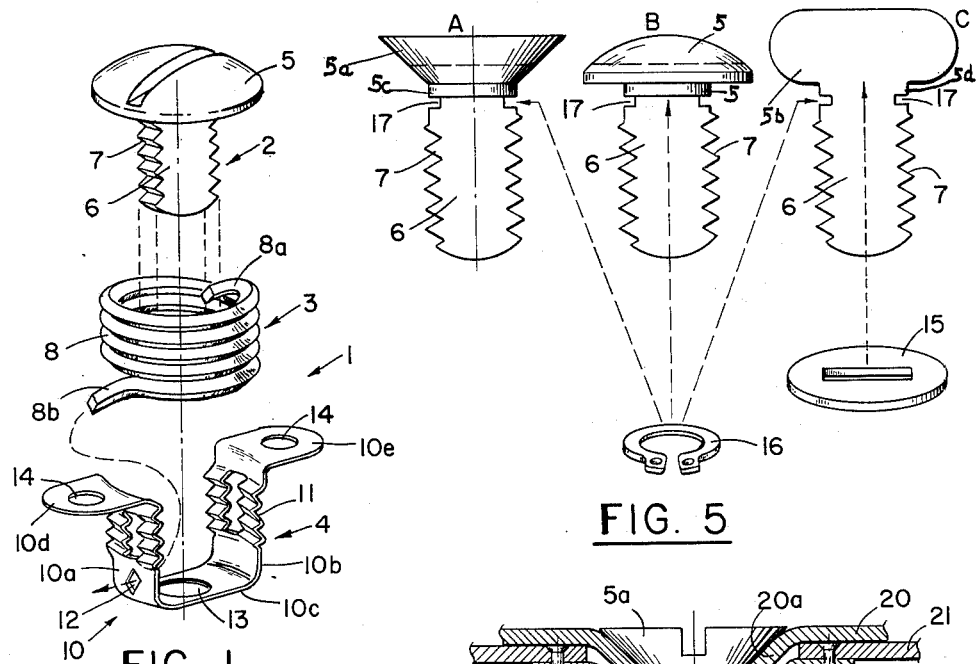
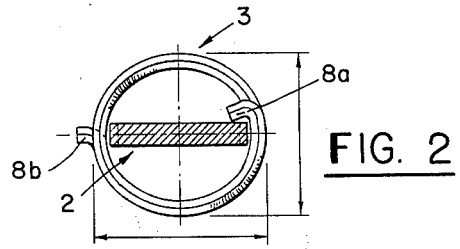
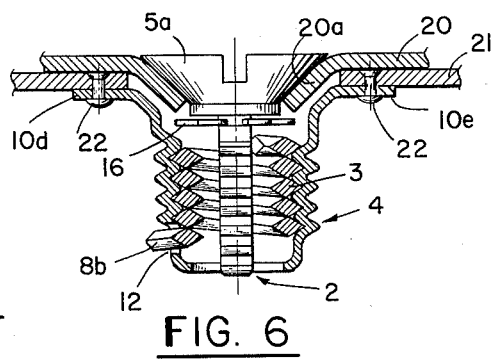
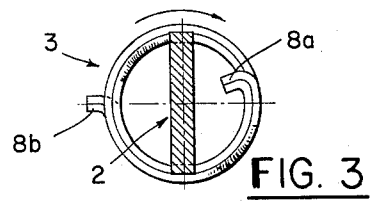
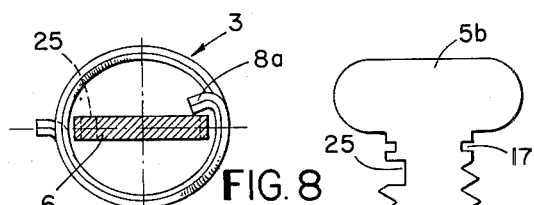
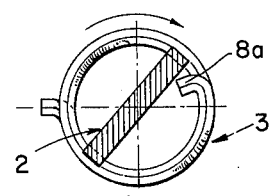
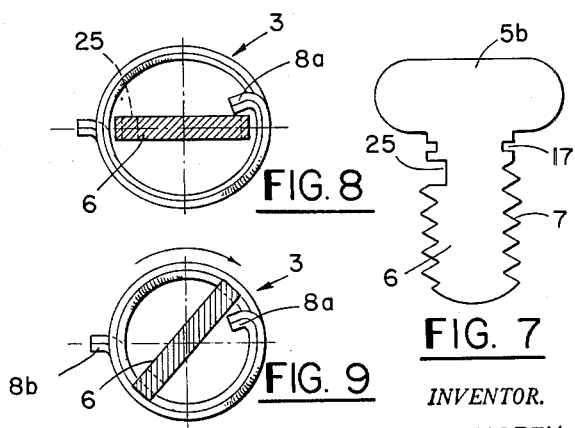
INVENTOR.
HENRY J. MODREY
BY
Hane and Nydick
ATTORNEYS Feb. 18, 1964 H. J. MODREY 3,121,453
QUICK-ACTING FASTENER DEVICE FOR SECURING
TOGETHER SEVERAL MEMBERS
Filed Nov. 8, 1960 2 Sheets-Sheet 2
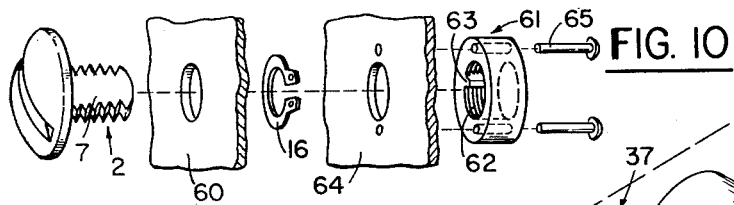
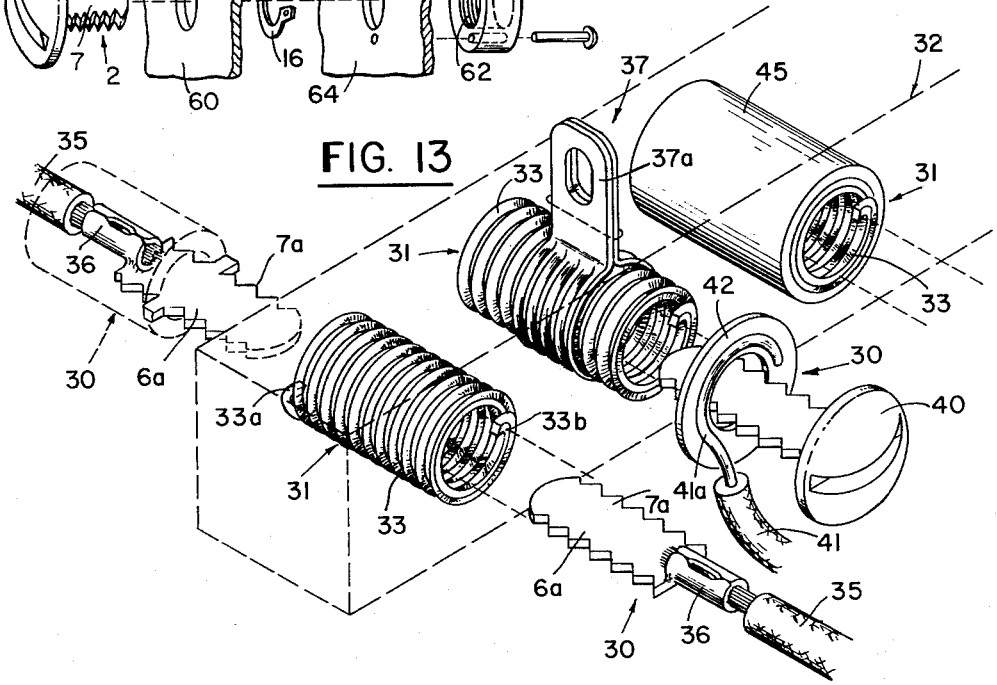
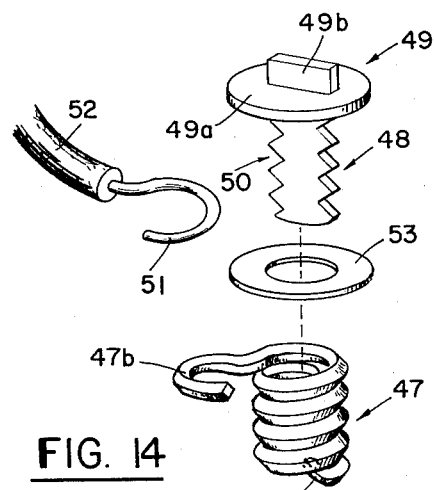
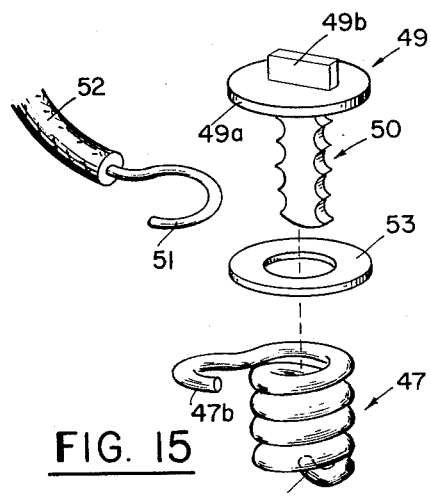
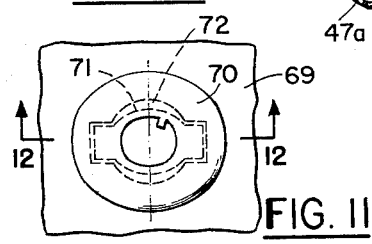
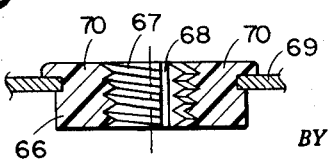
INVENTOR.
HENRY J. MODREY
BY Hane and Nydick
ATTORNEYS

United States Patent Office 3,121,453
Patented Feb. 18, 1964

3,121,453
QUICK-ACTING FASTENER DEVICE FOR SECURING TOGETHER SEVERAL MEMBERS
Henry J. Modrey, Eagle Drive, Stamford, Conn.
Filed Nov. 8, 1960, Ser. No. 67,978
1 Claim. (Cl. 151—41.7)

The present invention relates to fastening devices for securing together several members, and more particularly to quick-acting panel fasteners in which a threaded engaging member is screwed into a correspondingly threaded receiving member. It also refers to electrical connectors of the same type.

Such panel fasteners are extensively used, especially in aircraft construction, for joining several panels. Technical requirements for aircraft fasteners are exceptionally high as regards load capacity and resistance to vibration and shock.

The use of continuously threaded members in fasteners is time consuming since the engaging member may require many turns before it is tightened. Such fasteners cannot, therefore, be considered as quick-acting. For the purpose of this application and in accord with industrial usage, quick-acting fasteners and electrical connectors are therefore defined as devices which operate with a single turn of up to 360°. In the electrical field there is the additional danger that the conductor, such as a solid or stranded wire to be connected to a terminal, will be squashed or even broken by the application of excessive tightening pressure. Accordingly, it has often been found necessary to use torque wrenches limiting the tightening pressure to an acceptable maximum.

It is a broad object of the present invention to provide a novel and improved screw-type fastener on the general principle of the "interrupted screw," the engaging and receiving members of which can be locked together and released within approximately one half turn and are positively retained in the locked position whereby the fasteners are shock and vibration proof.

A more specific object of the invention is to provide a novel and improved fastener which does not require careful alignment of the threaded portions of the two members, but will lock after a predetermined turn of the engaging member has been effected and which positively prevents a turning of the engaging member beyond the locking position of the two members.

Another more specific object of the invention is to provide a fastener which adjusts itself automatically and within wide limits to different thicknesses of panels and other parts to be fastened.

Still another more specific object of the invention is to provide a novel and improved fastener as described which affords increased holding strength, where desired, by use of an engaging member which requires approximately one full turn and which also locks itself in the final position of engagement of the two members.

A further more specific object of the invention is to provide a novel and improved electrical connector for making inexpensive electric connections which, in addition to rapid and vibration-resistant, positive locking action and equally rapid unlocking action of the engaging member, affords the advantage of high quality contact characteristics.

A still further object of the invention is to provide a novel and improved electric connector in which the engaging member (the terminal of the connector) engages the receiving member (the socket of the connector) at multiple contact points under continuous pressure. As is evident, such connectors have a very low and constant contact resistance and are hence electrically highly advantageous.

Still another object of the invention is to provide a novel and improved electric connector which can be locked and to which conductors can be attached by means of a single type of tool, to wit: a pair of pliers, whereas heretofore the use pliers and of a screw driver was generally required to attach the conductors and to tighten the connector. The elimination of one of the types of tools customarily necessary to be employed in succession constitutes a considerable acceleration of the installation which is an important factor in mass installations as here involved.

Yet another object of the invention is to provide a novel and improved electrical connector which limits the maximum pressure exerted upon the engaged wire and effectively prevents deformation or damage to the conductors to be connected, thus obviating the need for special precautions, such as the use of torque wrenches.

It is also an object of the invention to provide a novel and improved fastener or connector for use in the mechanical and electrical field which is inexpensive to manufacture, as it does not require precision machined parts, is light in weight, reliable in its locking action, as it has no parts that are likely to fail, is vibration-resistant in its engaged position, and is convenient to install.

Other and further objects, features and advantages of the invention will be pointed out hereinafter and set forth in the appended claim.

In the accompanying drawing, several preferred embodiments of the invention are shown by way of illustration and not by way of limitation.

In the drawing:

FIG. 1 is an exploded perspective view of a half-turn panel fastener according to the invention;

FIG. 2 is a cross-sectional view of a receiving member and an engaging member inserted therein in the position prior to turning for locking;

FIG. 3 is a view similar to FIG. 2 and showing the engaging member in an intermediate stage of the locking operation;

FIG. 4 is a view similar to FIGS. 2 and 3 and showing the engaging member in its final and locked position;

FIG. 5 is an exploded view of several alternative half-turn engaging members and their mounting accessories;

FIG. 6 is a sectional elevational view of a half-turn fastener joining two panels in engaged and locked position;

FIG. 7 is a side view of a full-turn engaging member designed to afford increased holding strength;

FIG. 8 is a cross-sectional view, similar to FIG. 2, showing the engaging member of FIG. 7 inserted in the receiving member;

FIG. 9 is a view corresponding to FIG. 4 and showing the engaging member of FIG. 7 in its final and locked position;

FIG. 10 is an exploded view of a further modification of a panel fastener according to the invention and of the panels in which the fastener is to be mounted;

FIG. 11 is a plan view of a still further modification of the fastener;

FIG. 12 is a section taken on line 12—12 of FIG. 11 on an enlarged scale;

FIG. 13 is an exploded perspective view showing several forms of electric connectors according to the invention;

FIG. 14 is an exploded view of still another modification of an electric terminal connector according to the invention; and FIG. 15 is an exploded view similar to FIG. 14 and showing still another modification of an electric terminal connector.

Referring first to FIG. 1 in detail, the panel fastener 1 shown in this figure comprises an engaging member or stud 2, a receiving member or socket 3 and a mounting or anchoring cage 4.

Stud 2 comprises a head portion 5 and a shank portion 6.

The latter is of non-circular cross-section, a flat or strip-like shank of generally rectangular cross-section being shown, the two short sides of the shank being serrated or grooved to form helical thread segments 7.

Socket 3 is a member of a generally sleeve-shaped configuration which has on its inside wall helical screw threads. The socket has a slightly oval or elliptic cross-section and is made of an elastic or flexible material so that it will return into its initial elliptic position when forced out of the same toward a circular configuration by a radially outwardly applied force. The socket of FIG. 1 is shown as a coil formed by several turns of a springy wire 8, which may have a rhomboid cross-section, to define threads within the coil. The terminal portion or tang 8a of the socket illustrated is bent inwardly and the lower terminal portion 8b is turned outwardly for a purpose which will be more fully explained hereinafter. The socket 3 is shown as a closely coiled spring, but it may also consist of springy wires describing a steeper pitch. Alternatively, the socket may be formed from elastic material, such as nylon.

As previously indicated, locking of the fastener is effected by turning stud 2 within socket 3. To prevent turning of the socket, together with stud 2, due to the frictional pressure engagement between these two parts, the socket must be restrained and this is effected by anchoring terminal portion or tail 8b of the spring socket illustrated in a suitable manner. According to FIG. 1, the mounting or anchoring cage 4 for socket 3 comprises a strip 10 of sufficiently rigid material, which is given the U-shape of FIG. 1. The two upright branches 10a and 10b of the strip are serrated or grooved to form thread segments matching the threads on the outside of the coil socket formed by wire 8 or else the external configuration of the socket. The spacing of branches 10a and 10b is such that the two branches will accommodate one of the ends of spring socket 3 which in the embodiment shown is the major axis. Side branch 10a has an opening 12 to accommodate tail 8b, thus preventing rotation of the coil socket within the cage after insertion of the coil socket in the cage 4. The bight 10c of the cage has an opening 13 to receive the end of stud shank 6. The two free ends of branches 10a and 10b are bent off to provide mounting flanges 10d and 10e. Holes 14 through these flanges permit convenient attachment of the cage to, for instance, a panel. Of course, the cage may take a configuration different from the one shown. For instance, it may have more than two side arms or branches.

Turning now to FIGS. 2 through 4 to describe the principle of the locking action of the fastener according to the invention, this figure shows socket coil 3 with stud 2 inserted therein. The transverse width of the stud shank is such that it will be substantially equal to the inner major axis of the elliptic socket coil, and in any event the transverse width of the stud shank must be greater than the minor axis of the elliptic coil socket. In FIGS. 2, 3 and 4, the major axis is the horizontal one and, accordingly, the minor axis is disposed perpendicularly. As is now evident, stud 2 can be freely slid into the socket coil to any desired depth in the position in registry with the major coil axis and the stud is shown in that position in FIG. 2. When the stud is now turned from the position of FIG. 2 toward and into the position of FIG. 3, its teeth, disengaged from the coil teeth in the position of FIG. 2, become gradually engaged with the coil teeth due to the diminishing width of the socket coil. At the same time the stud shank forces the coil winding turns gradually from the initial elliptic configuration into a circular configuration which is reached after a quadrant or 90° turn. This position constitutes obviously the position of maximum tension of the coil and may be referred to as the dead center position.

When the rotation of stud 2 is continued past the dead center position, the coil tension begins to relax again and the coil would be completely relaxed, that is, the coil would return to its initial elliptic position if the turning of the stud would be continued through an angle of 180°. However, prior to reaching that position, further turning of the stud is blocked by engagement with tang 8a. This position is shown in FIG. 4.

As appears from the previous explanation, the teeth of the coil and the stud shank have become engaged during the turning of the stud, thus locking the two parts together and also pulling the two parts toward each other, depending upon the pitch of the threads. Furthermore, the stud is automatically locked in the position of FIG. 4. It cannot turn in clockwise direction due to tang 8a and can also not turn on its own in counter-clockwise direction since a turning in that direction must overcome the force which the spring coil opposes to being deformed into a circular configuration. In order to return the stud from the position of FIG. 4 into the position of FIG. 2, an external force must be applied strong enough to overcome the tension with which the coil opposes a deformation. Accordingly, the stud is safely and positively locked in the position of FIG. 4 and hence the fastener is shock and vibration proof in its locked position.

As is apparent from the previous analysis, the same conditions of tension, which are shown in FIGS. 2 through 4 for the second quadrant of turning, apply to the fourth quadrant of turning also. In other words, the stopping tang 8a may also be placed in a position approximately diametrically opposite to that of FIGS. 2 through 4. Such a location of the tang requires a turning through an angle of 340° instead of through an angle of about 150° as in FIG. 4, but affords the advantage of a more extended engagement of the threads and thus increases the holding strength. The locking strength depends upon (1) thread form, (2) pitch of coil of stud, and (3) half-turn or full-turn operation.

FIG. 5 shows three modifications, A, B and C, of the stud of the fastener. The shank of all three illustrated modifications are the same as the shank of the stud shown in FIG. 1, and hence designated by the same reference numerals. The left hand stud has a countersunk head 5a, the middle stud a binding head 5 and the right hand stud a wing head 5b. The stud heads of FIGS. 5A and 5B have a round portion 5c for inserting the stud in a mounting hole in a top panel to which the stud is to be attached and the stud head of FIG. 5C has a flat portion 5d for the same purpose. Any one of the three studs shown in FIG. 5 may be used with the socket coil 3 and the cage 4 of FIG. 1. In addition, FIG. 5 shows a washer 15 and a spring clip 16. The washer is used only with the flat wing head stud of FIG. 5C. Spring clip 16 can be snapped in a groove 17 provided in the shank of any stud shown and serves to retain the stud captive and rotatory inside its mounting hole in the top panel.

FIG. 6 shows a countersunk fastener assembled to join two panels 20 and 21. The fastener is assembled from the left hand stud of FIG. 5, the socket coil 3 and cage 4 of FIG. 1. As the head 5a of the stud is a countersunk head, a panel 20 is correspondingly preformed at 20a.

To assemble the fastener, the cage, after insertion of socket coil 3, is secured to panel 21 by spot welding or by means or rivets 22 extending through flange holes 14. The stud is attached to panel 20 by fitting the stud shank through the panel hole and slipping spring clip 16 into the grooves of the shank. Panel 20 is then placed upon panel 21 with the shank occupying a position corresponding to the position of FIG. 2. When the shank is now turned through an angle of approximately 150°, that is, into the position of FIG. 4, the threads of the shank and the socket coil become engaged and the two panels are pulled toward each other. Upon reaching the position of FIG. 4, the stud is automatically locked in the socket coil as previously described.

FIGS. 7, 8 and 9 show a modification of the fastener designed to increase the gripping strength of the stud within the socket coil where such increased strength is desired. To this end, the toothed portion of the shank is cut out at 25. The length of the cut-out is such that the cut-out will pass stop 8a when the stud is turned through a full turn, starting with the portion of FIG. 8, but will engage the stop after a further turn of the stud through an angle of approximately 150°. This position of engagement is shown in FIG. 9. As is apparent, the arrangement of FIGS. 7 through 9 increases the total length of the engaged threads and thus the axial pressure exercised by the fastener upon the joined panels. Alternatively, this modification increases the gripping capacity of the fastener, viz., its tolerance to grip thicker panels. The fastener adjusts automatically to any panel thickness provided the stud of the fastener is long enough. The stud is simply pushed down until the panels touch and are tightened from then onwards. The fastener will, for instance, without change clamp a thin metal panel to heavy plywood.

The fastener according to FIG. 10 comprises a stud 2 similar to the stud shown in FIG. 5B. The stud is secured in a panel 60 by means of a clip ring 16, as previously described. According to FIG. 10, the oval coil spring of the previously described embodiments of the invention is replaced by a socket 61 molded from a sufficiently elastic plastic, such as nylon, and having internal threads 62 of oval peripheral configuration. A longitudinally extending internal rib 63 performs the same function as the inwardly turned stop tang of the coil spring. The socket is fixedly secured to the lower side of a panel 64, for instance, by rivets 65. The attachment of the socket to the panel performs the same function as the anti-torsion tang or retaining means of the aforedescribed embodiments.

As is apparent, the fastener of FIG. 10 embodies the same principle as the previously described fastener and functions in the same manner. The fastener stud, when inserted through panel 64 into the socket parallel to the major axis of the threads thereof and then turned, will deform the socket threads into a circular configuration, thus tensioning the socket. The stud will be stopped by rib 63 after having been turned past dead center and while the socket is still in a partly tensioned condition, thus preventing the stud from returning into its starting position without the application of an external force.

In the fastener of FIGS. 11 and 12, the receiver for the stud is also in the form of a socket 66 made of elastically deformable material and having internal threads 67 of normally oval configuration. A stop rib 68 serves to arrest the stud in the locking position of the fastener, as previously described. The socket is mounted in an opening 71 of the panel 69 by pushing the socket into the panel opening. For this purpose, the socket is formed with a lip 70 and an external undercut, the outline of which is shown at 72 in FIG. 11 in the relaxed position of the socket. As is apparent, the panel opening provides sufficient clearance to permit deformation of the socket threads into a circular deformation when the stud is in its dead center position. The socket is rotationally held in the panel by the interlocking engagement of the socket and panel clearly shown in FIG. 11.

The operation of the fastener is evident from the previous description.

FIGS. 13, 14 and 15 show the utilization of the concept of the invention for an electric connector. The electric connector according to the invention affords all the advantages of the mechanical fasteners heretofore described. In addition, the electric connector of the invention affords specific and important electrical advantages.

The engaging member of the connector constitutes the terminal 30 and the receiving member the socket 31 of the connector. Three sockets are shown by way of example, and each should be visualized as being fitted in a terminal block. The arrangement and mounting of the terminal block are not essential for the understanding and concept of the invention, and hence terminal block 32 is only diagrammatically indicated by dashed lines.

As is evident, the socket is formed by a coil 33 similar in principle to the coil 3 of FIG. 1, that is, wound of springy wire and of slightly elliptic cross-sectional configuration in its relaxed condition. The coil is of a length sufficient to receive two terminals, one from each end. Both terminal portions of the spring are bent inwardly at 33a and 33b, respectively, to form stops corresponding to the stop 8a of FIG. 1.

The coil should be visualized as being fairly tightly fitted in a round bore in terminal block 32. The bore has a diameter corresponding to the outer major axis of coil 33 to permit deformation of the coil from the elliptical shape into a cylindrical or circular shape. Spring 33a is so deformed as to engage an indentation in the bore of the block in which it serves as anti-torque under which the socket is deformed by turning of the stud terminal.

Terminal 30 comprises a flat shank portion 6a formed with teeth 7a along its short sides in the same manner as has been described for stud 2 of FIG. 1. The teeth of shank 6a, and also of all other shanks described herein, may be formed by a stamping operation. Wire 35 is connected to shank 6a by means of a crimped sleeve 36.

As is evident, shank 6a constitutes the pole element of the connector and the terminal is connected to the socket by inserting the shank in the coil and positively locking the same in the coil in the same manner as has been described in connection with FIGS. 2 through 4, by a 150° turn.

The shank or pole element of the terminal when engaged to the socket will engage the same at multiple contact points and these contact points are under constant spring pressure due to the deformation of the coil, both in radial and axial directions. Accordingly, the entire system is ideally suited for the storage of kinetic energy on the contacting surfaces. The pressures at the multiple contact points will continuously and automatically adjust each other. As is evident, the electric connection achieved by the terminal according to the invention affords the advantage of a very low and constant contact resistance.

The socket shown in the middle of the terminal block comprises a coil 33 similar to the coil previously described. The coil is retained within the bore of the terminal by a clamping strip 37 enveloping the coil. The strip may have ears 37a which protrude from the terminal block thereby preventing a rotation of the coil within the bore of the block. Ears 37a serve as anti-torque anchors, but can also be conveniently used for connecting outside circuit components. The coil must be long enough, because deformation of its center portion is prevented by clamping strip 37. The coil may be of such length that terminals can be inserted from both sides of the terminal block.

The terminal of the middle connector has a shank similar to the left hand terminal. The head of the terminal is shown as a binding screw head 40, so that this type has outer resemblance to the customary screw-type terminals. A wire 41 is connected to the connector by looping the stripped wire end 41a about the shank and clamping the wire end between head 40 and a washer 42 which in turn is clamped against the socket coil. This saves a number of screw turns (150°) and has built-in maximum compression on the wire.

Finally, the right hand socket coil is fitted in a cylindrical metal sleeve 45, which in turn may be visualized as being molded in the terminal block. The inner diameter of sleeve 45 again corresponds to the outer major axis of the inserted coil, one tang of which is anchored to it. Sleeve 45 may be conveniently used to make any desired number of outside connections. Either one of the illustrated terminals may be used in co-action with the right hand socket.

FIG. 14 shows a simplified electric terminal of the screw-type comprising a socket 47 and a stud 48. Socket 47 is again formed by a spring coil of slightly elliptical cross-sectional configuration. Tang 47a is bent inwardly to form the stop for the stud and the other end portion of the spring coil is bent out to form an anchoring tail 47b. This tail may be used to mount the socket coil in a suitable manner, for instance, by riveting or spot-welding.

The terminal has a head portion 49 and a flat shank portion 50 toothed as previously described and constituting the pole element. Head portion 49 has a disc-shaped part 49a and a lug part 49b instead of a screw slot.

The stud is positively locked to the socket as previously described and the stripped end loop 51 of a wire 52 is clamped between disc 49a and a washer 53, which in turn abuts against the top turn of the socket coil.

Terminal 49 replaces the screw driver slot customarily provided on binding screws.

Connection of a wire to a terminal connector, as here involved, reqires the use of pliers for bending the wire loop 51 and fitting the same about the pole element and the use of a screw driver for tightening the binding screw, that is, the tools must be changed for each operation. The provision of lug 49b instead of a slot eliminates the need for using a screw driver. The electrician can perform the entire operation with a single tool. This involves a significant saving in the wiring operation. The maximum pressure is built in. In ordinary binding screw terminals, the pressure is critical. Kinetic energy in such a system is stored only in the deformation of the wire. Such energy diminishes when the deformation of the wire becomes permanent. Too much pressure may break or weaken the wire or clip wire strands. The system of the invention stores energy per se.

The terminal of FIG. 15 is very similar to that of FIG. 14, except that the diamond-shaped wire of FIG. 14 is replaced by round wire. The teeth-forming serrations on the shank of the terminal are, of course, also shaped to In this connection, it should be mentioned that round match the round wire of the socket coil.
wire and corresponding shank serrations can also be used for the receiving member of all the other illustrated connectors. It should also be mentioned that the simplified shape of FIGS. 11 and 12 is suitable for a nylon molded panel fastener of the simplest construction, in which the cage is omitted. Such a fastener comprises only a molded socket 47 with a mounting ear 47b, with threads inside, provided it is elastic enough to deform from oval to round. Fasteners of that design are suitable for small forces only.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed as new and desired to be secured by Letters Patent is:

A fastener for releasably joining several members, comprising a receiving member in the form of a helically wound springy coil of slightly elliptic cross-sectional configuration in its relaxed condition, the turns of the coil forming internal and external threads, an elongated engaging member having a non-circular cross-section, the maximum width of said engaging member being greater than the inner minor axis of said coil and smaller than the inner major axis thereof, the wall portions of said engaging member defining the maximum width thereof being formed with thread segments threadedly engageable with the internal threads formed by the turns of said coil, said engaging member being slidably insertable in said coil at an angle in reference to the inner minor axis thereof at which said threads are disengaged and rotatable within the coil, rotation of the engaged member deforming the coil toward a cylindrical configuration and moving said threads of the coil and the engaging member into engagement thereby locking the two members together and pulling the same toward each other, a stop means in the form of an inwardly bent terminal portion of said coil to limit rotation of the engaging member in a predetermined direction past the position of maximum deformation of the coil to an angle at which the engaging member occupies a position posterior of the maximum deformation of the coil and anterior of complete relaxation thereof, a U-shaped mounting cage providing spaced side walls for said coil, said coil being nested within said cage and secured thereto by a portion of said coil projecting through an opening in one side wall of said cage to prevent rotation of the coil in reference to the cage, the side walls of the cage being helically grooved, the turns of said coil engaging said grooves for axially securing the coil within the cage, the grooved wall portions of said cage being longitudinally slotted to permit deformation of said wall portions in radial direction, and mounting means for securing the cage to one of the members to be joined.

References Cited in the file of this patent

UNITED STATES PATENTS

| | | |
|---|---|---|
| 1,261,014 | Dorgan et al. | Apr. 2, 1918 |
| 1,832,362 | Cullinan | Nov. 17, 1931 |
| 2,121,784 | Busby | June 28, 1938 |
| 2,186,746 | Albin | Jan. 9, 1940 |
| 2,362,118 | Dawson | Nov. 7, 1944 |
| 2,372,566 | Gazley | Mar. 27, 1945 |
| 2,557,126 | Macy | June 19, 1951 |
| 2,560,961 | Knohl | July 17, 1951 |
| 2,794,475 | Pachmayr | June 4, 1957 |

FOREIGN PATENTS

| | | |
|---|---|---|
| 563,016 | Great Britain | July 26, 1944 |